June 10, 1930.   F. KUHN ET AL   1,762,176
ELECTRIC TOASTER
Filed March 19, 1928
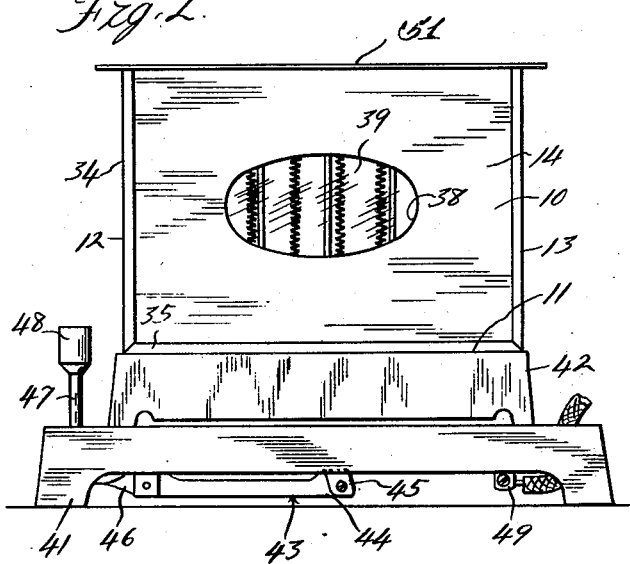
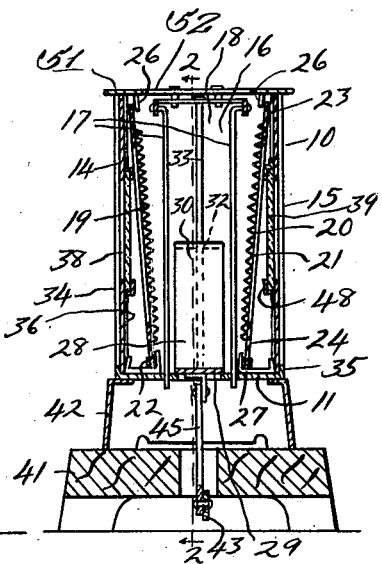
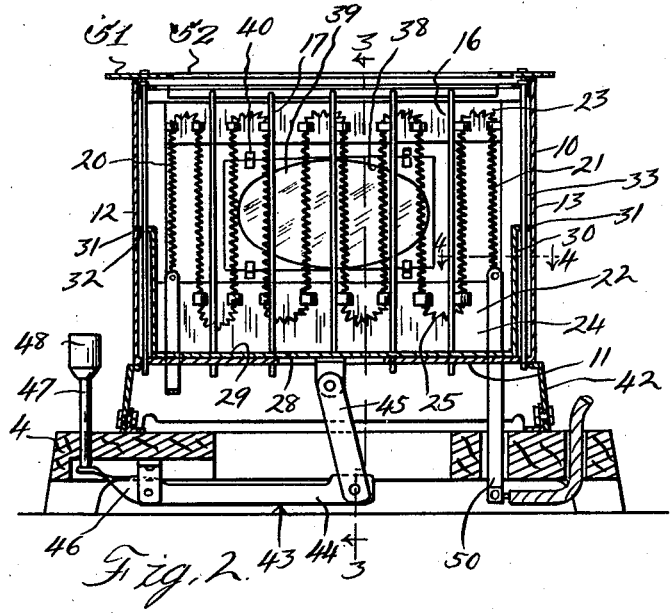
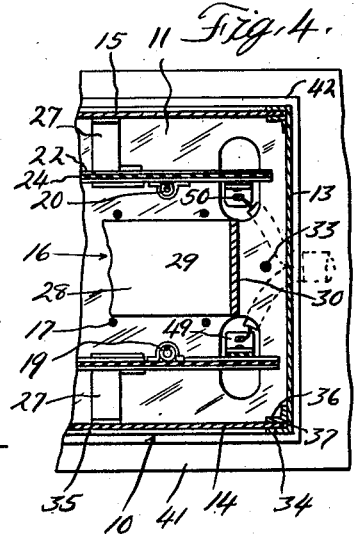
Inventors
Frank Kuhn
Laurence H. Thomas
By Whittemore Hulbert & Whittemore Belknap
Attorneys Patented June 10, 1930

1,762,176

UNITED STATES PATENT OFFICE

FRANK KUHN AND LAURENCE H. THOMAS, OF DETROIT, MICHIGAN, ASSIGNORS TO AMERICAN ELECTRICAL HEATER COMPANY, OF DETROIT, MICHIGAN, A CORPORATION OF MICHIGAN

ELECTRIC TOASTER

Application filed March 19, 1928. Serial No. 262,915.

The invention relates to electric toasters and the like and more particularly to a type wherein the bread slice while being toasted is concealed within a housing or casing and subjected to radiation from two sets of electrical resistors arranged on each side thereof.

The primary object of the invention is to provide a construction of the above mentioned type in which the slice may be observed while being toasted so that it may be removed at the proper time. To this end we have constructed the improved electric toaster hereinafter more fully described, which in general consists of an arrangement wherein windows are provided in the walls of the outer casing and the resistor elements and the supporting members for the toast are constructed to leave open spaces through which the toast may be observed.

For further explanation of the invention reference should be made to the accompanying drawings, wherein—

Figure 1 is a side view of the improved electric toaster;

Figure 2 is a vertical section therethrough on the line 2—2 of Figure 3; and

Figure 3 is a cross section on the line 3—3 of Figure 2.

Figure 4 is a horizontal section on the line 4—4 of Fig. 2.

Referring now to the construction as illustrated, the toaster comprises a rectangular outer metallic casing 10 having a bottom portion 11, ends 12 and 13 and sides 14 and 15. Within the casing 10 is arranged a slice retaining cage 16 having the vertically extending laterally spaced rods 17 bounding a space 18 of a size adapted to receive the bread slice. Between the cage 16 and the outer walls 14 and 15 are arranged resistor elements 19 and 20, which as shown consist of a continuous length of coiled resistor wire arranged in a series of parallel rows 21 and extending for substantially the full length of the space 18. The resistors are preferably mounted on frames 22, each of which has horizontal insulating top and bottom strips 23 and 24 respectively to which the looped portions 25 of the resistor element are attached. As shown these frames 22 are spaced closer together at the bottom of the toaster than at the top thereof and are held in inclined position by engaging clips 26 at the upper ends and clips 27 at the lower ends.

Within the cage 16 there is a toast supporting member 28 which as shown comprises the horizontal flat strip 29 having upwardly extending side portions 30 which in turn are provided with laterally extending ears 31. The ears 31 are apertured at 32 for slidably engaging the vertical end rods 33.

The bottom plate 11 and end members 12 and 13 are preferably formed from a single piece of sheet metal and each is provided with marginal flanges 34 and 35 respectively. 36 is a strip arranged parallel to the flange 34 forming a vertical groove 37 in which the side panel 14 is slidably inserted. The side panels 14 and 15 are provided with window openings 38 preferably arranged in the center of the panels. These window openings are preferably closed by transparent material, and as shown there is a glass panel 39 held in position by clips 40. The area of the window opening is preferably small in comparison with the total area of the side panel 14 but is sufficiently large to permit direct observation of the toast within the cage through the spaces between the resistor rows and between the rods 17.

The height of the cage 16 is such as to permit the normal slice of bread to be housed completely within the outer casing when the supporting device 28 is in its lower position. It is preferable to provide a mechanism for raising these supporting means so that the slice may be ejected from the upper part of the cage when it has been completely toasted. Any suitable means may be employed for this purpose but as shown the following construction is used.

41 is a standard, having mounted thereon the metallic apron 42 which in turn supports the bottom plate 11. 43 is a lever fulcrumed on the standard and having one arm 44 thereof connected to the underside of the member 29 by a link 45. The other end 46 of the lever extends into operative relation with a vertical slidable pin 47 having a handle 48 at the upper end thereof. The arrangement is such that by depressing the handle 48 the lever 43 will be operated and the slice supporting member 28 raised in the cage 16.

The electrical resistance elements are preferably connected in series and the terminals 49 and 50 thereof are connected to an electric cord in the usual manner.

As clearly illustrated in Figures 2 and 3 of the drawing the casing 10 may be provided with a top 51 having a centrally arranged longitudinally extending opening 52. The opening 52 will be of a size and shape sufficient to permit the passage therethrough of a bread slice, whereby the bread slice may be placed in or ejected from the casing.

In the operation of the device the bread slice is received within the cage 16 to be fully contained within the casing 10. The heating elements cause both sides of the slice to be toasted simultaneously and the condition of the toast can be observed through the window openings since there are spaces between the parts of the heating element and between the vertical bars of the cage. The slice is expelled from the device by operation of the handle 48, thus raising the upper edge of the slice above the device where it can be removed from the toaster.

What we claim as our invention is:

1. In an electric toaster, a cage for a bread slice, heating elements arranged adjacent said cage, guide rods arranged adjacent the ends of said cage, and a vertically movable member arranged within said cage and adapted to support a bread slice on one edge thereof, said vertically movable member being apertured to receive the said guide rods whereby the same is accurately guided during its vertical movement.

2. In an electric toaster, a cage for a bread slice, heating elements arranged adjacent said cage, guide rods arranged adjacent the ends of said cage, a vertically movable member arranged within said cage and adapted to support a bread slice on one edge thereof, said vertically movable member being apertured to receive the said guide rods whereby the same is accurately guided during its vertical movement, and means for moving said vertically movable member, said means including a lever fulcrumed at a point below said cage, a link connecting one end of said lever to the said vertically movable member, and means associated with the other end of said lever for moving the same about its fulcrum.

In testimony whereof we affix our signatures.

FRANK KUHN.
LAURENCE H. THOMAS.